Figure 1:
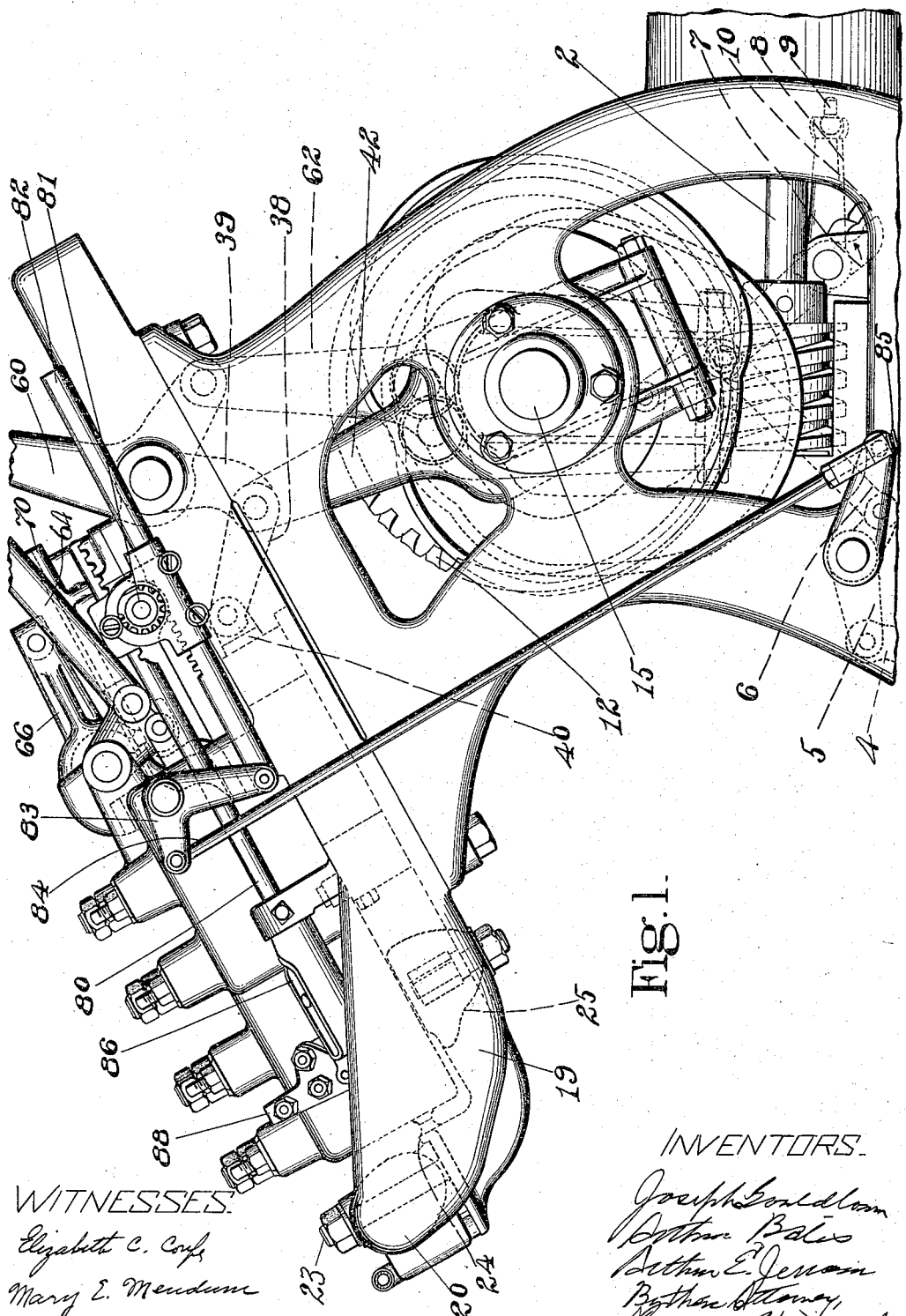

J. GOULDBOURN, A. BATES & A. E. JERRAM.
MACHINE FOR SHAPING THE MATERIALS OF THE REAR PORTION OF A BOOT OR SHOE UPPER.
APPLICATION FILED DEC. 31, 1913.

1,156,897.   Patented Oct. 19, 1915.
6 SHEETS—SHEET 1.

WITNESSES:   INVENTORS.

J. GOULDBOURN, A. BATES & A. E. JERRAM.
MACHINE FOR SHAPING THE MATERIALS OF THE REAR PORTION OF A BOOT OR SHOE UPPER.
APPLICATION FILED DEC. 31, 1913.

1,156,897.

Patented Oct. 19, 1915.
6 SHEETS—SHEET 3.

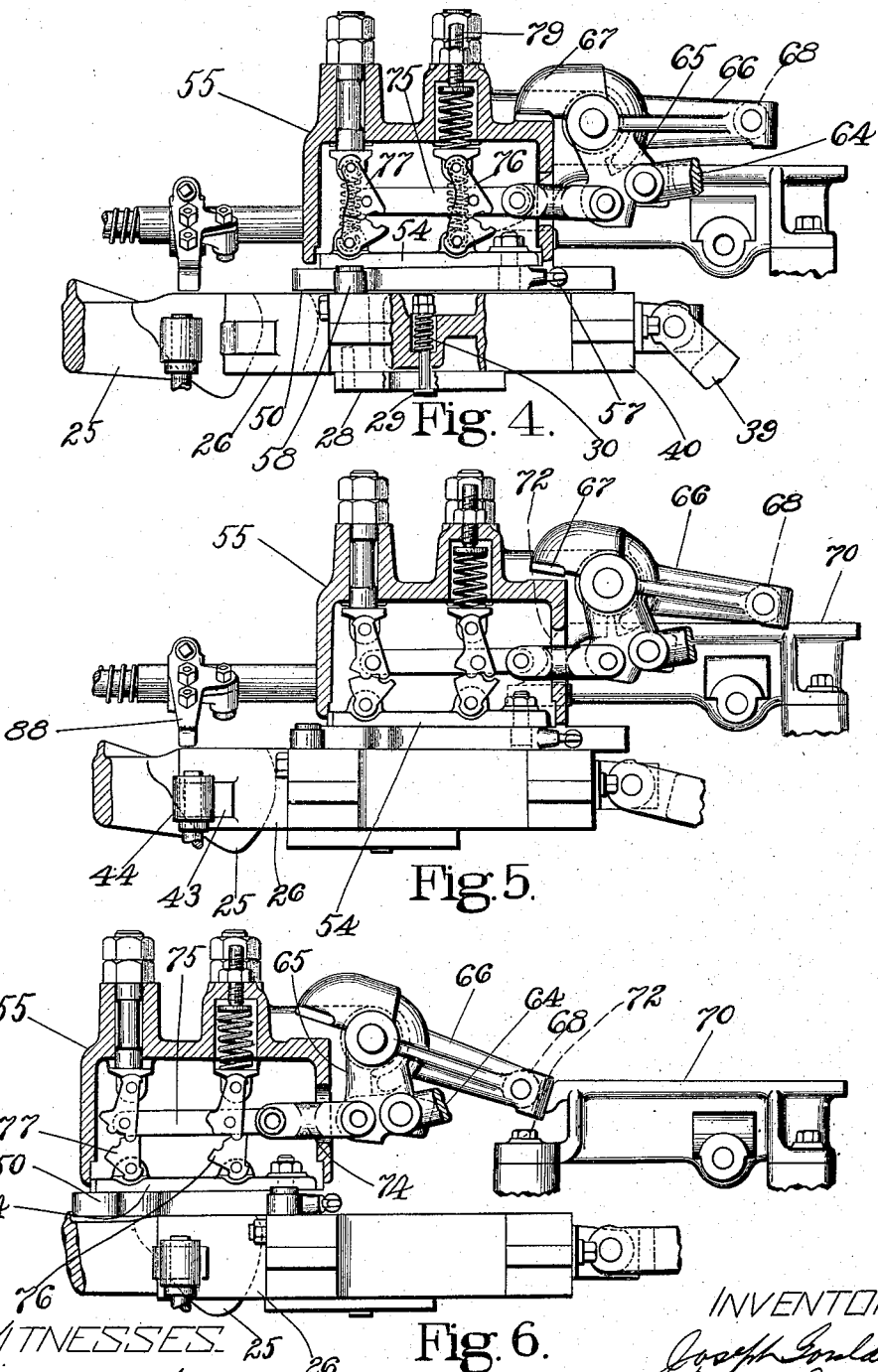

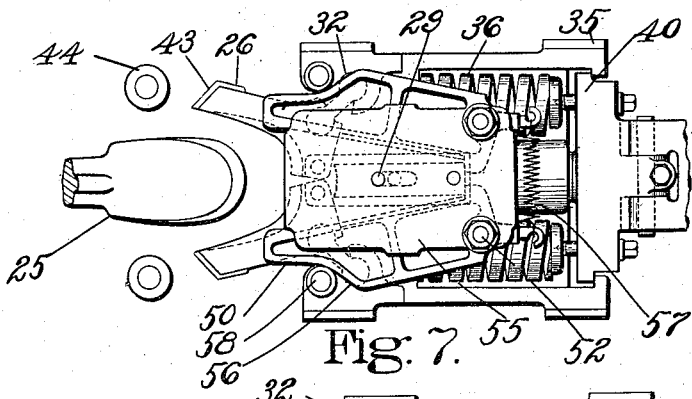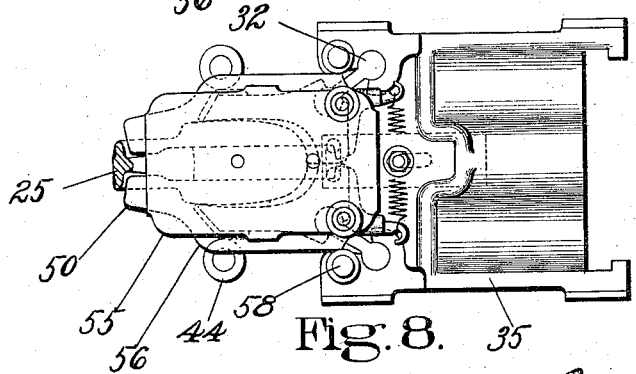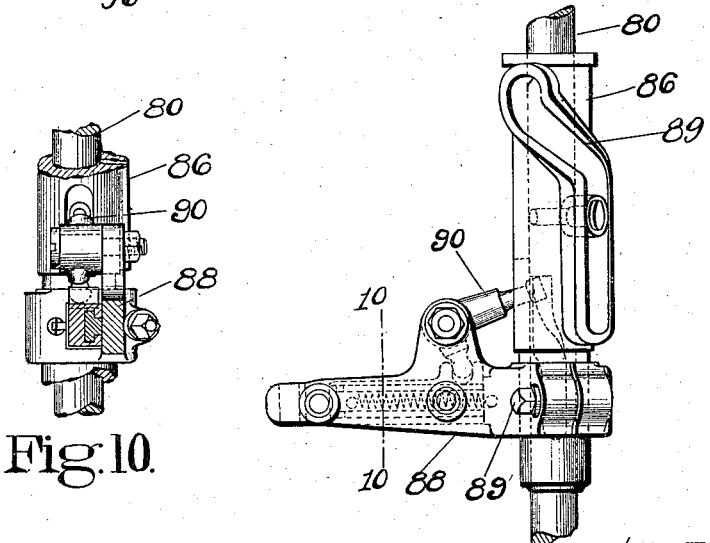

J. GOULDBOURN, A. BATES & A. E. JERRAM.
MACHINE FOR SHAPING THE MATERIALS OF THE REAR PORTION OF A BOOT OR SHOE UPPER.
APPLICATION FILED DEC. 31, 1913.

1,156,897.

Patented Oct. 19, 1915.
6 SHEETS—SHEET 6.

WITNESSES:
Elizabeth C. Coupe
A. Blanche Hargraves

INVENTORS.
Joseph Gouldbourn
Arthur Bates
Arthur E. Jerram
By their Attorney
Helen M. Donard

UNITED STATES PATENT OFFICE.

JOSEPH GOULDBOURN, ARTHUR BATES, AND ARTHUR ERNEST JERRAM, OF LEICESTER, ENGLAND, ASSIGNORS TO UNITED SHOE MACHINERY COMPANY, OF PATERSON, NEW JERSEY, A CORPORATION OF NEW JERSEY.

MACHINE FOR SHAPING THE MATERIALS OF THE REAR PORTION OF A BOOT OR SHOE UPPER.

1,156,897.  Specification of Letters Patent.  Patented Oct. 19, 1915.

Application filed December 31, 1913. Serial No. 809,662.

*To all whom it may concern:*

Be it known that we, JOSEPH GOULDBOURN, ARTHUR BATES, and ARTHUR ERNEST JERRAM, subjects of the King of England, and residing at Leicester, Leicestershire, England, have invented certain Improvements in Machines for Shaping the Materials of the Rear Portion of a Boot or Shoe Upper, of which the following description, in connection with the accompanying drawings, is a specification, like reference characters on the drawings indicating like parts in the several figures.

This invention relates to shoe making machinery and particularly to machines for molding the rear portions of shoe upper materials preparatory to the pulling-over and lasting operations. Machines for performing such operations have been proposed as disclosed by British specifications 26,698 of 1909 and 23,685 of 1912, and the object of this invention is to provide a machine embodying certain improvements over prior machines which increase its convenience for use and effectiveness of operation.

With this object in view, an important feature of the invention consists in an organization and arrangement of a molding machine by which there is provided an open space below and around the inside former to permit the presentation of the work thereto from underneath.

In accordance with a further feature of the invention the parts are so arranged that the operator can conveniently look down into the work to see that the upper materials are properly arranged about the inside former before the outside former is closed. Preferably the inside former is so constructed and supported that a work receiving space is provided in front of those portions embraced by the work so that the forepart of the upper is not distorted while the rear part is being molded. Ingenuity has been required to support the inside former for a shoe upper so that these conditions are fulfilled for clearance all around, below and in front of the inside former, while furnishing adequate strength to resist the forward pressure of the outside formers in doing their work.

Another feature of the invention relates to novel and very effective means for producing compression of the upper materials between the flange forming wipers and the heel seat face of the inside former. The conditions above suggested as desirable for presenting the work to the inside former and for rigidity of mounting for that former render it advisable to maintain the inside former stationary, as distinguished from the vertically movable inside formers heretofore proposed. This introduced the problem of producing a satisfactory organization for depressing the wipers with adequate power after they had been advanced over the shoe bottom. Because of the manner in which they are used and the occasions for replacements it is required that wipers be plates of such thinness that they are not absolutely rigid. To meet these conditions the illustrated embodiment of this feature of the invention provides a mechanism containing wipers which is movable bodily over the formers, and means is comprised in said mechanism for depressing the wipers relatively to other parts of the mechanism for effecting compression of the overwiped stock. This feature of the invention is embodied in a wiper carrying slide containing a frame which is movable up and down in the slide, and operating mechanism, shown as toggles, for depressing the frame and the wipers relatively to the body portion of the slide to iron down the stock.

In accordance with a further feature of this invention connections are provided through which the direction of application of the force for advancing and closing the wipers is changed as the wipers approach the end of such movement and is caused to take effect in depressing the wipers. This result is herein obtained by connecting the wiper advancing means with the wiper depressing toggles and providing devices which are operative to prevent full straightening of the toggles until substantially the end of the stroke of said means.

Another feature of this invention relates to novel mechanism for positioning, and preferably pulling, the upper about the inside former preliminary to the closing of the outside formers. This mechanism comprises grippers engaging the upper materials, preferably including the ends of the heel stiffener, in the shank at each side of the inside former, holding these parts at the right elevation, and pulling them forwardly to cause them snugly and smoothly to embrace the inside former before the outside formers close. In the illustrated embodiment of this feature of the invention means is provided for closing and moving the grippers by the same treadle or other controller that is caused by a further movement to start the power mechanism for closing the outside formers and operating the wipers. The machine is also so organized that the grippers are caused to release the upper automatically from pulling strain during the final part of the molding operation and also preferably to retreat to an out-of-the-way position after which they are returned automatically to work receiving position at the end of the molding operation.

Another feature of the invention relates to novel mechanism for operating the wipers to first close inwardly over the sides of the heel end of the material and thereafter to move forwardly to operate upon the rear end thereof, a method which is found to give superior results in the finished upper.

The several features of the invention above mentioned and others including certain details of construction and combinations of parts will now be described with the aid of the accompanying drawings and the combinations for which protection is sought will then be pointed out in the claims.

Figure 2:
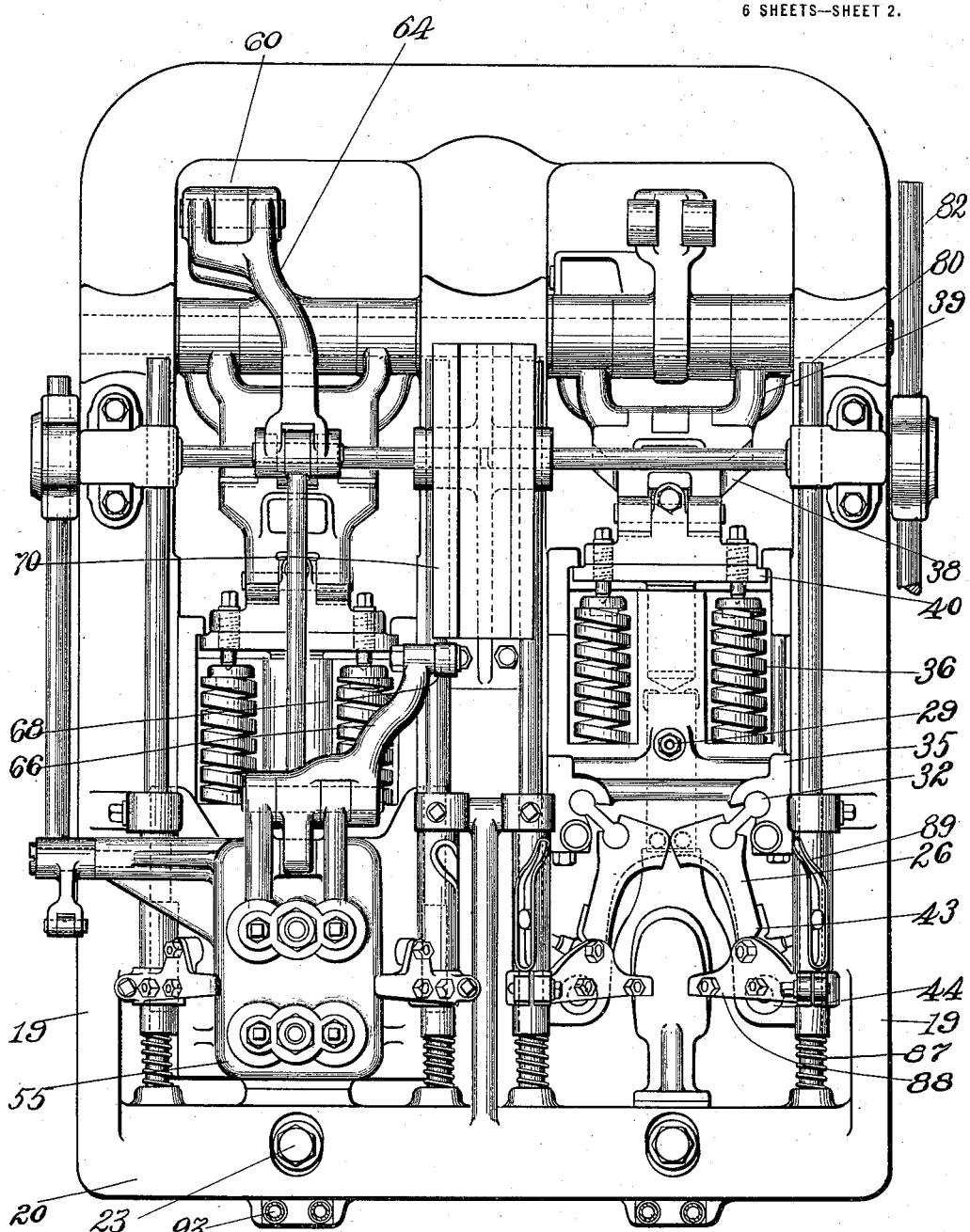
Figure 3:
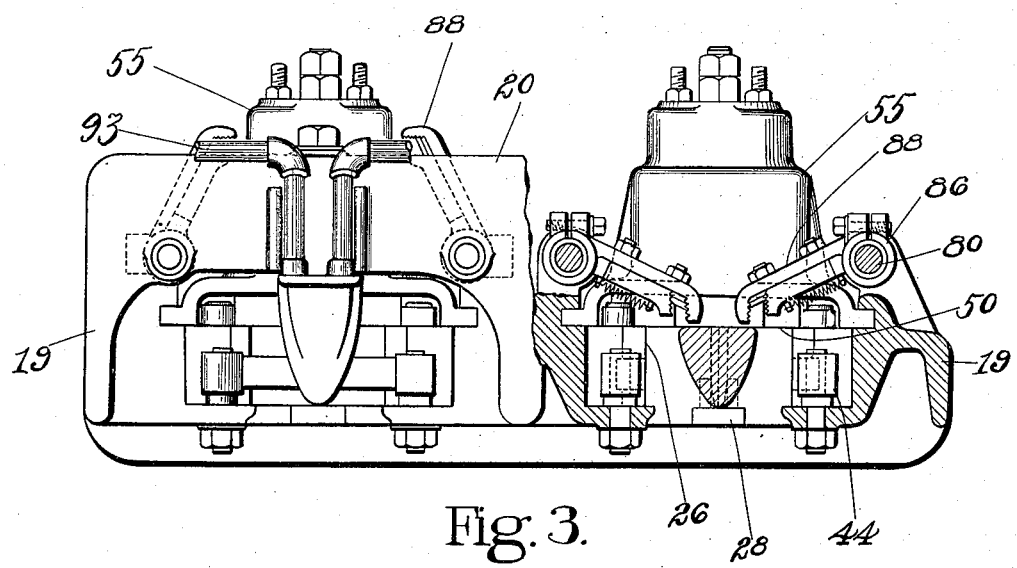
Figure 11:
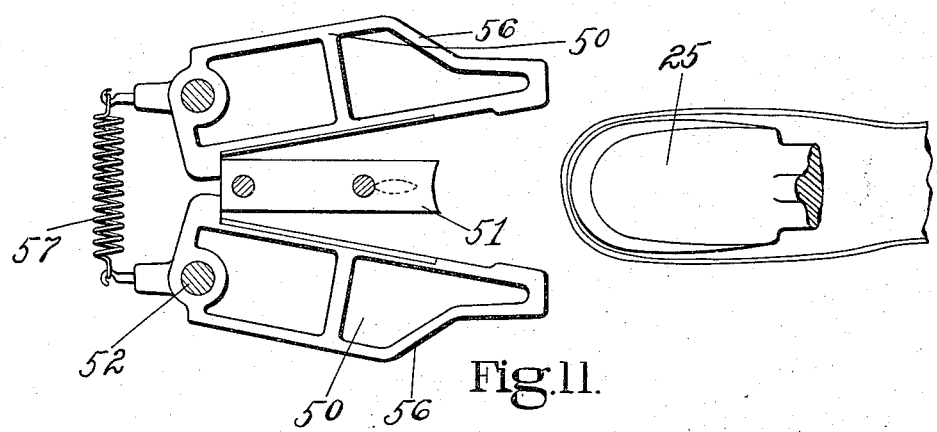
Figure 12:
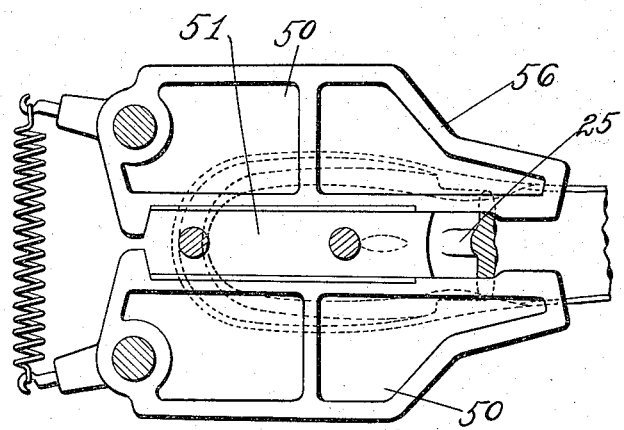
Figure 13:
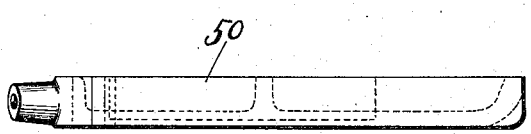
Figure 14:
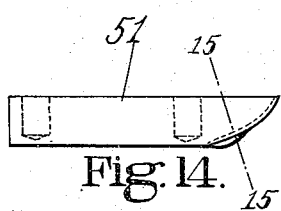
Figure 15:
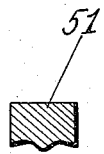

Figure 1 is a side elevation of the machine. Fig. 2 is a plan view, showing that the machine is a duplex apparatus in one of the molding mechanisms of which work will stand under molding pressure while another upper is being arranged in the companion mechanism. The operating parts of the left hand mechanism are shown in their advanced, work treating positions while the devices of the right hand mechanism, with the parts above the wipers removed, are shown open. Fig. 3 is a front view, partly in vertical transverse section through one of the inside formers, and showing the work receiving relation of the grippers to that former. Fig. 4 is a vertical longitudinal section through the right hand mechanism of Fig. 2, showing the several parts in open, work receiving positions. Fig. 5 shows the same parts when the outside formers have been advanced and closed, the wipers being still retracted; Fig. 6 shows the wipers advanced and the work under pressure, as in the left hand mechanism of Fig. 2. Fig. 7 shows, in plan, the open position of the formers and wipers, as in Fig. 4. Fig. 8 shows the closed positions of the same as in Fig. 6. Figs. 9 and 10 are two detail views of the gripper operating mechanism, Fig. 10 being a section on line 10—10 of Fig. 9. Fig. 11 is a plan view showing the wipers open. Fig. 12 is a similar view showing the inside former thrust backwardly into the field of operation of the wipers and the wipers closed and advanced for laying the marginal portion of the upper materials over the heel seat face of the former. Fig. 13 is a side elevation of one of the side wipers shown in Figs. 11 and 12. Figs. 14 and 15 are respectively side and sectional views of the end wipers shown in Figs. 11 and 12.

Particular attention has been given to the arrangement and organization of the machine to provide for the operator's convenience in presenting the work and watching the operation of the machine thereon as the work goes under pressure; and also to the construction of the machine for the purpose of securing the requisite distribution of strength of the machine to resist rigidly the molding strains without rendering the machine unnecessarily heavy or massive. In these connections it may be pointed out, referring to Figs. 1, 2 and 3, that the working plane is arranged at a slight inclination to the horizontal and at an elevation allowing the operator to look down into the work. The machine is open below the inside former, as best shown in Fig. 1, and also all around the former, see Fig. 2, to allow the work to be applied to the former from underneath and supported while being put under compression. The support for resisting forward pressure against the inside former is a powerful yoke extended forwardly in the working plane of the machine and then upturned to a plane above the work engaged portions of the former as shown in Fig. 1. These characteristics contribute materially to the practical value of the machine.

Referring to Fig. 1, the column of the machine is bowed rearwardly and has bearings for a pulley shaft 2 that extends from rear to front of the machine and bears a clutch which is arranged to be closed by the elevation of treadle rod 4 through connections 5, 6, 7, 8 and 9, Fig. 1, with a lost motion at 10 for a purpose which will later appear. The pulley shaft 2 has a worm by which, and a worm gear 12, it drives the cam shaft 15 extending at right angles to pulley shaft 2 and bearing cams from which the upper molding mechanisms are operated by power.

The upper part of the machine frame is inclined forwardly and its top surface slopes downwardly toward the operator so that when he places an upper in the machine he can readily observe the location of the upstanding margin of the heel portion, thereby enabling him to locate the upper accurately with relation to the molding mechanisms. Mounted on the top of the frame are inner and outer heel molds, wipers for wiping inwardly the rear upstanding portion of the margin to form the inturned flange and to press the latter down upon the inner mold, and grippers to engage the shank portion of the margin to strain it forwardly against the rear end of the inner mold and thus maintain the upper in position until the outer mold has engaged it, the grippers then retiring to permit the wipers to operate. The machine comprises two sets of molding devices, but as these are similar in all respects except their time of operation, only one will be described.

The head of the machine is extended forwardly relatively to the column in two lateral arms 19 as will be seen from Figs. 1 and 2, these forward extensions being provided between their outer ends with a crossbeam 20 having two guideways or seats on its under side, Figs. 1 and 3, for the reception of the inner molds 25. Each inner mold has, as best appears in Fig. 1, an upwardly and forwardly extended attaching portion which is shaped to fit its seat and has also a lip or shoulder 24 located to abut against the inner side of the cross-beam. A bolt 23 passes through the cross-beam and is threaded into the inner mold. By these means the inner mold 25 is very rigidly supported against the stresses to which it is subjected, and yet is readily replaceable, while at the same time an unobstructed space for presentation, support and adjustment of the work is provided and maintained on all sides (Fig. 3) and in front (Fig. 1) of the inner mold.

The outer mold is located directly behind the middle of the inner mold and comprises two formers 26, Figs. 2, 3 and 7, pivotally connected to a slide 28 upon which the formers rest and by which they are upheld, Fig. 4. The slide has a slotted connection with a supporting bolt 29, Fig. 4, acted upon by a spring 30, thereby providing possibility for the formers 26 to yield downwardly to a slight extent under stress. Each of the two formers is also connected by a swivel joint to a link 32 having a similar connection with a pressure applying slider 35 that is actuated forwardly through two heavy helical springs 36, Fig. 2. The rear ends of these springs abut against a crosshead 40 which is connected to one end of the forward link 38 of a toggle, Fig. 1, the rear end of the other link 39 being pivoted to the frame of the machine. The junction of the two links of the toggle is connected to a depending yoke 42 actuated by a cam on the shaft 15.

The arrangement of the links 32, 32 and of their connections to the outside formers 26 is such that they exert an inward thrust at an inclination to the direction of operative movement of the molds and they also distribute the forming pressure evenly over the back part of the heel.

In order that the outside formers may be closed in before their back corners contact with the back of the upper, cam faces or inclines 43 on the forward ends of these formers (Figs. 2 and 7) are provided which, during the forward movement of the formers, contact with rolls 44 secured to the machine frame and push the formers together. This prevents the possibility of the back corners of the formers nipping the upper.

The wipers comprise two side plates or wiper plate carriers 50 and a rear wiper 51, Figs. 7 and 8, and 11 to 15, of which the two side wipers are pivotally supported near their rear ends at 52 upon a loose frame 54 that is located within the superstructure, Figs. 4, 5 and 6, which will be designated as the wiper carrying slide 55.

The wipers 50, like the outside formers 26, normally stand wide apart and back away from the inside former as indicated in Figs. 7 and 11 to give ample room around the inside former 25 for the presentation and adjustment of the upper materials before the formers close. The wipers have cam or incline faces 56 that are held by a spring 57 against cam rolls 58 as shown in Fig. 7 and that close the wipers when the wipers first begin to advance before the rear wiper engages the work. The rear wiper 51 is rigidly attached to the frame or plate 54 which depresses the wipers for compressing the stock.

The advance movement of the wiper carrying slide 55, carrying with it the end wiper 51, is derived through connections with a bell crank 60, Fig. 1, which is fulcrumed to the frame and has its lower, backwardly bent arm connected with a rising and falling yoke 62 actuated from a cam on the shaft 15. The connection from the bell crank 60 to the slide 55 comprises a link 64 connected at its forward end to the depending arm 65 of a second bell crank which has a rearwardly projecting arm 66 in Figs. 1, 2, 4, 5, 6 carrying a roll 68 overlying a cam track 70 on the frame which has a step at 72. The depending arm 65 is also connected by a link 74 to a thrust bar 75 operating two wide toggles 76, 77, Figs. 4, 5 and 6, located between the wiper carrying slide and the loose frame or plate 54 to which the wipers 50 and 51 are connected, one toggle being arranged near each end of the loose frame. This connection provides that the wiper carrying slide shall first be advanced with the wipers held, by the action of cam 70 on arm 66, high enough above the heel seat face of inside former 25 to bend over and break down the upper materials upon the inside former and then, after the wipers reach their fully closed position, roll 68 slides down the step 72. This allows bell crank 65, 66 to turn about its pivotal connection to the wiper carrying slide and thereby to act through link 74 and thrust bar 75 to straighten the toggles for depressing the wipers powerfully upon the heel seat after the completion of their forward movement. In the return movement step 72 raises the wipers at once to prevent outward drag on the work. This is done by rocking the bell crank 65, 66 in the direction to flex the toggles. The extent of this rocking movement is limited by a shoulder 67 on the bell crank coming into engagement, Fig. 4, with the wiper carrying slide whereby the toggles are relieved from backward pull, but not until the wipers have been lifted high above the work, higher in fact, as may be seen by comparing Figs. 4 and 5, than they were during the advancing or wiping stroke.

The toggles 76, 77 rest upwardly against stiff springs the tension of which can be adjusted by screws 79. The toggles preferably comprise toothed engaging faces formed eccentrically to the pivots of the links and arranged for causing the toggles, as they are straightened, to press the wipers forcefully downward and lock them.

The grippers for engaging the work at opposite sides of the shoe and tensioning it forwardly about the inside former preparatory to the action of the formers are each operated by a sliding rod 80, Figs. 1, 2, 3, 9 and 10, each gripper and its operating means being substantially the same. The rod is arranged to extend horizontally from front to back of the machine in bearings attached to the frame and its rear end is toothed as shown in Fig. 1 and is connected by a pinion on the same shaft to the pinion 81, rack bar 82, bell crank 83, rod 84 and spring 85 through to the lever 5 which is operated by the starting treadle. Upon the gripper rod 80 is a sleeve 86 confined between a rod bearing and a rearwardly acting spring 87 Fig. 2, and having a cam slot 89 into which extends a cam roll carried by the rod 80. A radial arm 88 is adjustably mounted by clamp screw 89' upon the sleeve 86, the outer end of the arm being toothed to form one jaw of the gripper. Guideways are formed on the under side of this arm for a second arm which is arranged to slide in the guideways and carries on its outer end a second jaw. A bell crank lever 90, Fig. 9, is pivoted to the radial arm 88 and its short arm engages the sliding jaw to move it for closing and opening the gripper. The other arm of lever 90 engages a stop face on rod 80, Fig. 9, so that when the rod is moved forwardly the gripper is closed. After the gripper has been closed further forward movement of the sliding rod 80 will carry it and the sleeve and the gripper against the action of spring 87, thus moving the upper toward the toe of the shoe and stretching it adequately about the heel end of the inner mold.

The described connection of gripper rod 80 with the starting treadle lever 5 provides that while the lost motion at 10 between lever 5 and the starting clutch is being used the rod 80 acts through bell crank 90 to close the jaws upon the work and then to advance the jaws to pull the upper forwardly. This is manually controlled movement and the work may be adjusted about the mold 25 or manipulated as it may require before the machine is started by the closing of the clutch. The pinion has a blank part which is brought opposite bar 82 to permit the necessary further depression of the treadle to start the machine. The gripper retains its hold until the outside formers move forwardly sufficiently far to press the materials upon the inner mold and then the forward movement of the wiper carrying slide carries the bell crank 83 with it, thus causing it to move the pinion reversely so that the sliding rod 80 is moved rearwardly to release the gripper. This is automatic in that it is obtained from the power mechanism. After the gripper has been released the rearward motion continues sufficiently far to cause the cam groove in the sleeve 86 to rotate the sleeve and thus rock the gripper upwardly to remove it out of the way of the work. This rotational movement of the gripper is produced by movement of the cam roll in a spiral part of the cam groove. When the wiper carrying slide again retires at the conclusion of the machine's cycle the gripper is returned to such a position level with the top of the inner mold that it is ready to grip a new upper when it is placed upon the mold. The inner mold is preferably heated by steam and is therefore provided with a steam chamber to and from which lead steam pipes 93 as in Fig. 3.

In the use of the machine the upper is applied upwardly to the inside former from underneath it, the clear space about the former, see Figs. 2, 3, 4 and 7, including the space directly in front of it, Fig. 1, for the reception of the forepart of the upper without distortion, making it possible to arrange the upper quickly and accurately and to watch from above the adjustment of the work. The upper and the ends of the heel stiffener at the shank are guided into the grippers which are then closed and advanced by the starting treadle. The operator may pause and relax the pull on the upper and rearrange it before starting the machine if it does not pull satisfactorily about the inside former. Further depression of the treadle starts the power mechanism which closes the outside formers and then advances and finally depresses the wipers and comes to rest with the work under compression to set, the inside former being preferably heated. As the wiper carrying slide advanced the grippers were released and were turned up as in Fig. 3, left hand side. It will be understood that this is a duplex machine and that while the mechanism on one side of the machine has been operated as described, that on the other side has been restored to work receiving position, the outside formers being drawn back against springs 26 by the interlocking engagement of crosshead 40 with the slider 35, Fig. 7, and the grippers being turned down to the position shown at the right of Fig. 3.

Having fully described our invention, what we claim as new and desire to secure by Letters Patent of the United States is:—

1. A machine for molding the rear portions of shoe upper materials, having, in combination, an inside former and outside formers and supporting and operating mechanism therefor all arranged with the working plane at a slight inclination to the horizontal and at an elevation allowing the operator to look down into the work, said machine being open below the inside former and also around the inside former to allow the work to be applied to said former and supported by the operator from underneath while being put under compression, substantially as and for the purposes described.

2. A machine for molding the rear portions of shoe upper materials, having, in combination, an inside former and outside formers and supporting and operating mechanism therefor, the support for resisting pressure of the outside formers against the inside former comprising a yoke extending forwardly in the working plane of the machine and then upturned to a plane above the work engaged portions of said inside former to afford clearance for the forward portion of the shoe upper.

3. A machine for molding the rear portions of shoe upper materials, having, in combination, a machine frame the upper part of which is inclined forwardly with its top surface sloping downwardly toward the operator at an elevation at which the operator can readily observe the location of the upstanding margin of the heel portion of the work, an inside former supported on said frame to permit the work to be positioned upon it from underneath and to afford clearance in front thereof for the forward portion of the shoe upper, coöperating outside formers, and wipers for wiping the upstanding margin of the work down upon the inside former.

4. A machine for molding the rear portions of shoe upper materials, having, in combination, an inside former shaped like the rear portion of a last and having its front end upturned to provide an attaching portion extending above its work shaping portion to provide an unobstructed work receiving space in front of said former and below and on all sides thereof, coöperating outside formers and operating mechanism to open and retract the outside formers.

5. A machine for molding the rear portions of shoe upper materials, having, in combination, a frame having a head extended forwardly in two lateral arms, a crossbeam connecting the front ends of said arms and provided with a seat, an inside former having an upwardly and forwardly extended attaching portion shaped to fit the seat on the cross-beam, means retaining the former on its seat all arranged to present an unobstructed space around the work embraced portions of the inside former for the presentation, support and adjustment of the work; outside formers and operating means therefor.

6. A machine for molding the rear portions of shoe upper materials, having, in combination, an inside former, outside formers, a slide to which the outside formers are pivotally connected and by which they are upheld, a supporting bolt having connection with the slide, and a spring acting on the bolt and providing possibility for the outside formers to change slightly their vertical position in the machine during operation.

7. A machine for molding the rear portions of shoe upper materials, having, in combination, an inside former, outside formers, a slide to which the outside formers are pivotally connected, a pressure applying slider, and swivel link connections between the slider and the outside formers forming struts arranged to direct pressure forwardly and then inwardly for advancing and closing the outside formers, substantially as described.

8. A machine for molding the rear portions of shoe upper materials, having, in combination, an inside former, outside formers, a slide to which the outside formers are pivotally connected, a pressure applying slider, swivel link connections between the slider and the outside formers, a crosshead, springs interposed between the crosshead and slider to cushion closing movement of the formers, an interlocking engagement between the crosshead and slide to effect retraction of the outside formers, and mechanism for operating the crosshead.

9. A machine for molding the rear portions of shoe upper materials, having, in combination, an inside former, outside formers, a slide to which the outside formers are pivotally connected, a pressure applying slider, swivel link connections between the slider and the outside formers forming struts arranged to direct pressure forwardly and then inwardly for advancing and closing the outside formers, inclines on the forward portions of the outside formers and abutment rolls in the path of said inclines for closing the forward portions of said formers against the inside former at the start of their advance movement.

10. A machine for molding the rear portions of shoe upper materials having, in combination, an inside former, outside formers and operating mechanism including means for initially closing the outside formers before their rear corners contact with the back of the upper, and means constructed and arranged to direct yielding pressure forwardly and inwardly against the outside formers for advancing and further closing said formers.

11. A machine for molding the rear portions of shoe upper materials, having, in combination, inside and outside formers and operating mechanism therefor, a wiper carrying slide movable bodily over the formers, a loose frame movable up and down within said slide, wipers connected to said frame, and operating mechanism to advance the slide and to close the wipers and to actuate the loose frame to depress the wipers automatically subsequently to their initial closing.

12. A machine for molding the rear portions of shoe upper materials, having, in combination, inside and outside formers and operating mechanism therefor, and a flange wiping and ironing down mechanism that is movable bodily from a retracted position to a position over the work to overwipe the flange of the upper materials upon the heel seat face of the inside former, and means comprised in said last mentioned mechanism for applying ironing down pressure to said flange.

13. A machine for molding the rear portions of shoe upper materials, having, in combination, work holding means, wipers and operating mechanism serving to advance the wipers in one plane and automatically to depress the wipers substantially perpendicularly to that plane after their initial advance.

14. A machine for molding the rear portions of shoe upper materials, having, in combination, work holding means, wipers and operating mechanism serving to advance the wipers in one plane and automatically to depress the wipers substantially perpendicularly to that plane after their initial advance and to raise the wipers from the work at the beginning of their retraction.

15. A machine for molding the rear portions of shoe upper materials preparatory to lasting, having, in combination, an inside former rigidly mounted in fixed position, means for clamping the upper around the inside former, wipers, means for operating the wipers for flanging the upper, and flange-compressing means operating automatically to press the wipers nearer to the tread face of the formers after they have turned in the flange of the upper and to cause reverse movement of the wipers at the beginning of their retraction.

16. A machine for molding the rear portions of boot and shoe uppers comprising an inside former, a coöperating outside former, wipers for flanging the upper, flange-compressing means, and operating mechanism including an automatically operated member provided with connections for advancing the wipers and connections to the flange-compressing means.

17. A machine for molding the rear portions of boot and shoe uppers comprising an inside former, a coöperating outside former, wipers for flanging the upper, flange-compressing means and operating mechanism including an automatically operated member provided with connections for advancing the wipers and connections to the flange compressing means, combined with devices adapted to modify the position of an element which is common to said two connections so that movement of said automatically operated member in one direction first causes the formation of the flange and then its compression.

18. A machine for molding the rear portions of shoe upper materials, having, in combination, work holding means, wipers and operating mechanism serving to advance the wipers in one plane and comprising toggle mechanism maintained against straightening movement while the wipers advance and straightened at the end of the advance to depress the wipers for ironing down the flange of the upper materials.

19. A machine for molding the rear portions of shoe upper materials, having, in combination, work holding means, wipers and operating mechanism serving to advance the wipers in one plane and comprising toggle mechanism and a cam and connections arranged to maintain the toggle flexed while the wipers advance and to cause straightening of the toggle to depress the wipers to take place at a predetermined point in their advance.

20. A machine for molding the rear portions of shoe upper materials, having, in combination, work holding means, end embracing wipers and power mechanism operating to advance and close the wipers in one plane to bend over and break down the flange portion of the work and at the end of the advance to effect automatically a depression of the wipers upon the work.

21. A machine for molding the rear portions of shoe upper materials, having, in combination, work holding means, end embracing wipers and operating mechanism including means to advance the wipers, and means to change the direction of application of the wiper advancing force at a predetermined point in the travel of the wipers and cause such force to be applied for depressing the wipers.

22. A machine for molding the rear portions of shoe upper materials, having, in combination, work holding means, wipers, wiper advancing means, wiper closing means, and wiper depressing means.

23. A machine for molding the rear portions of shoe upper materials, having, in combination, work holding means, 25, 26, 26, wipers, wiper advancing means, closing means including the inclines 56 and the abutment rolls 58 and wiper depressing means including the toggles 76, 77.

24. A machine for molding the rear portions of shoe upper materials, having, in combination, an inside former, grippers for engaging the sides of the upper and pulling the upper materials forwardly about said former, outside formers and power operating mechanism therefor including a clutch and its controlling treadle, and connections from said treadle to operate the grippers before the clutch is caused to start the power operating mechanism.

25. A machine for molding the rear portions of shoe upper materials, having, in combination, an inside former, grippers for engaging the sides of the upper and pulling the upper materials forwardly about said former, outside formers and power operating mechanism therefor, and a treadle to close and advance the grippers to do their work, said power mechanism operating to open the grippers, remove them from proximity to said inside former and later to return them automatically to work receiving relation to the inside former.

26. A machine for molding the rear portions of shoe upper materials, having, in combination, an inside former, a gripper located adjacent to each lateral side of the former and mounted for movement to pull the upper forwardly about the former, manually operated mechanism to close the gripper and to effect its upper pulling movement, an outside former and operating mechanism therefor arranged to open the grippers after the outside formers have taken control of the upper, to remove the grippers in a direction other than that of their pulling movement away from the formers, and later to restore the grippers to work receiving relation to the formers.

27. A machine for molding the rear portions of shoe upper materials, having, in combination, inside and outside formers, mechanism for operating the outside formers, grippers for holding the upper about the inside former until the outside formers close and means for throwing the grippers out of action automatically after the outside formers have taken control of the work.

28. A machine for molding the rear portions of shoe upper materials, having, in combination, inside and outside formers, mechanism for operating the outside formers, grippers for holding the upper about the inside former until the outside formers close and a controlling member which upon being actuated first operates the grippers and thereafter effects the starting of the operating mechanism for the outside formers.

29. A machine for shaping an end portion of a shoe upper having, in combination, a gripper to tension the upper, power operated means to shape the upper, and a treadle having connection with the gripper to effect tensioning of the upper and having connections operated by additional movement of the treadle to start the power operated shaping means.

30. A machine for shaping the rear portions of shoe upper materials including a vamp and a heel stiffener having, in combination, an inside heel former the rear end face of which has a vertical curvature to which the upper materials are to be shaped, coöperating outside forming means to effect such shaping of the upper materials, and grippers constructed and arranged for operation to seize the wings of the heel stiffener and the edge of the vamp and maintain said stiffener and vamp edge in selected vertical relation to the forming means while said stiffener and vamp are being shaped to the vertical curvature of the rear end of the inside former.

31. A machine for shaping the rear portions of shoe upper materials including a vamp and a heel stiffener having, in combination, an inside heel former the rear end face of which has a vertical curvature to which the upper materials are to be shaped, coöperating outside forming means to effect such shaping of the upper materials, grippers constructed and arranged to seize the stiffener wings and the adjacent edge of the vamp in the shank, operating mechanism for the forming means, and means for causing the grippers to pull forwardly and draw the marginal portion of the upper materials snugly to the rear end face of the inside former before the formers clamp the upper and to hold the stiffener wings and the gripped edge of the vamp in correct vertical position during the upper shaping operation of the forming means.

32. A machine for molding the heel portions of shoe upper materials preparatory to lasting, having, in combination, an inside former, an outside former, upper flanging wipers, operating means for causing said formers and wipers to mold and flange the upper, grippers adapted to engage the upstanding margin of the upper on both sides in the region of the shank, and operating means for the said grippers which cause them to pull the upper about the inside former prior to the molding operation and to release the upper before the flanging operation.

33. A machine for shaping the upper materials of the end portion of a shoe having, in combination, end embracing wipers adapted to slide over the shoe bottom with an advancing and closing movement, and operating mechanism for said wipers including connections through which the direction of application of the wiper sliding force is changed as the wipers approach the end of such movement and is caused to take effect in depressing the wipers.

34. A machine for shaping the upper materials of the end portion of a shoe, having, in combination, end embracing wipers adapted to slide over the shoe bottom with an advancing and closing movement, and operating mechanism for said wipers including wiper sliding means, wiper depressing means, connections between said two means, and devices holding the depressing means for operation through said connections during a portion of the wiper sliding movement.

35. A machine for shaping the upper materials of an end portion of a shoe, having, in combination, end embracing wipers adapted to slide over the shoe bottom with an advancing and closing movement, and operating mechanism for said wipers including wiper sliding means, wiper depressing toggles, connections between said sliding means and toggles, and cam controlling means determining the time at which the toggles shall be straightened.

36. A machine for molding the rear portions of shoe upper material having in combination work holding means, wipers, and means operating to advance said wipers first to bend over the flange portions of the work at the sides and afterward bend over the flange portion at the rear end.

37. A machine for molding the rear portions of shoe upper materials preparatory to lasting, having, in combination, an inside former, heel seat forming wipers, and operating means to move the wipers over the sides of the former to form the flange on the sides of the heel seat and then to cause the wipers to travel forwardly over the flange under pressure to set the flange so that its tendency to spring back is overcome or reduced.

38. A machine for shaping the rear portions of shoe upper materials having, in combination, heel seat forming wipers, and operating means to cause the wipers to form and set the heel seat flange of the upper at the sides of the heel seat by folding the stock substantially transversely of the edge of the heel seat and then rubbing the flange under pressure substantially lengthwise of said edge and, finally, applying to the flange pressure which is directed from above downwardly upon the heel seat.

39. A machine for shaping an end portion of a shoe comprising side wipers and an end wiper and operating mechanism by which the side wipers are first closed inwardly and are then moved forwardly with the end wiper.

40. A machine for shaping the rear portion of a shoe comprising an inside former, outside formers, means for operating said formers, wipers and operating mechanism therefor constructed and arranged to cause the upstanding margin of the end portion of the upper at the sides of the inside former to be wiped inwardly over the tread face of the former before the margin at the end of the former.

41. A machine for shaping an end portion of a shoe comprising side wipers and an end wiper and operating mechanism by which the side wipers are closed inwardly and the end wiper is advanced and the wipers and the shoe are then moved relatively to effect compression of the shoe stock carried by the side and end wipers.

In testimony whereof we have signed our names to this specification in the presence of two subscribing witnesses.

JOSEPH GOULDBOURN.
ARTHUR BATES.
ARTHUR ERNEST JERRAM.

Witnesses:
FREDERICK WILLIAM WORTH,
LEONARD WARWICK.

It is hereby certified that in Letters Patent No. 1,156,897, granted October 19, 1915, upon the application of Joseph Gouldbourn, Arthur Bates, and Arthur Ernest Jerram, of Leicester, England, for an improvement in "Machines for Shaping the Materials of the Rear Portion of a Boot or Shoe Upper," an error appears in the printed specification requiring correction as follows: Page 8, line 31, claim 34, for the word "for," read *from;* and that the said Letters Patent should be read with this correction therein that the same may conform to the record of the case in the Patent Office.

Signed and sealed this 14th day of March, A. D., 1916.

[SEAL.]

J. T. NEWTON,
*Acting Commissioner of Patents.*

Cl. 12—97.